United States Patent [19]

Kim et al.

[11] Patent Number: 5,546,132
[45] Date of Patent: Aug. 13, 1996

[54] NTSC INTERFERENCE DETECTOR

[75] Inventors: Kyeong S. Kim; Jong K. Kim, both of Seoul, Rep. of Korea

[73] Assignee: Goldstar Co., Ltd., Seoul, Rep. of Korea

[21] Appl. No.: 351,581

[22] Filed: Dec. 7, 1994

[51] Int. Cl.[6] .................................................. H04N 7/00
[52] U.S. Cl. .......................... 348/607; 348/21; 375/346; 375/350; 455/63
[58] Field of Search .................... 348/607, 608, 348/609, 426, 21, 471, 472; 455/296, 306, 307, 308, 303, 63; 375/285, 346, 350; H04N 5/21, 7/00, 7/04, 11/04

[56] References Cited

U.S. PATENT DOCUMENTS

| 5,087,975 | 2/1992 | Citta et al. | |
| 5,121,203 | 6/1992 | Citta | |
| 5,151,785 | 9/1992 | Citta | |
| 5,181,112 | 1/1993 | Citta et al. | 348/608 |
| 5,260,793 | 11/1993 | Citta et al. | 348/607 |
| 5,325,204 | 6/1994 | Scarpa | 348/607 |
| 5,408,262 | 4/1995 | Kim et al. | 348/21 |
| 5,410,569 | 4/1995 | Halozan | 375/286 |
| 5,438,369 | 8/1995 | Citta et al. | 348/21 |

Primary Examiner—Safet Metjahic
Assistant Examiner—Chris Grant
Attorney, Agent, or Firm—Finnegan, Henderson, Farabow, Garrett & Dunner, L.L.P.

[57] ABSTRACT

An NTSC interference detector is disclosed which includes an NTSC extracting filter for extracting an NTSC signal component from a received I-channel signal; a comparing portion for integrating the NTSC signal output from the NTSC extracting filter for a predetermined period and deciding whether the NTSC signal component is above a first reference value or not; and a control signal generator for adding the signal output from the comparing portion for every horizontal sync, deciding the presence or absence of NTSC interference according to a second reference value, and outputting a control signal according to the presence or absence of NTSC interference, thereby accomplishing a precise detection of NTSC interference.

15 Claims, 8 Drawing Sheets

NTSC INTERFERENCE DETECTOR

BACKGROUND OF THE INVENTION

The present invention relates to an HDTV system, and more particularly, to an NTSC interference detector for detecting an NTSC signal to thereby determine whether a post-comb filter is used or not.

Figure 1:
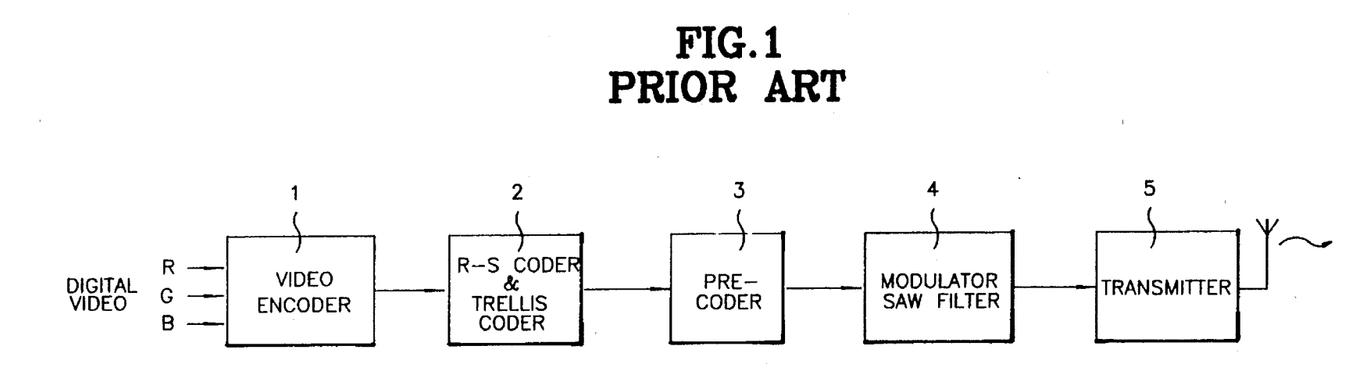
FIG. 1 is a block diagram of a transmission system for an HDTV system.
Figure 2:
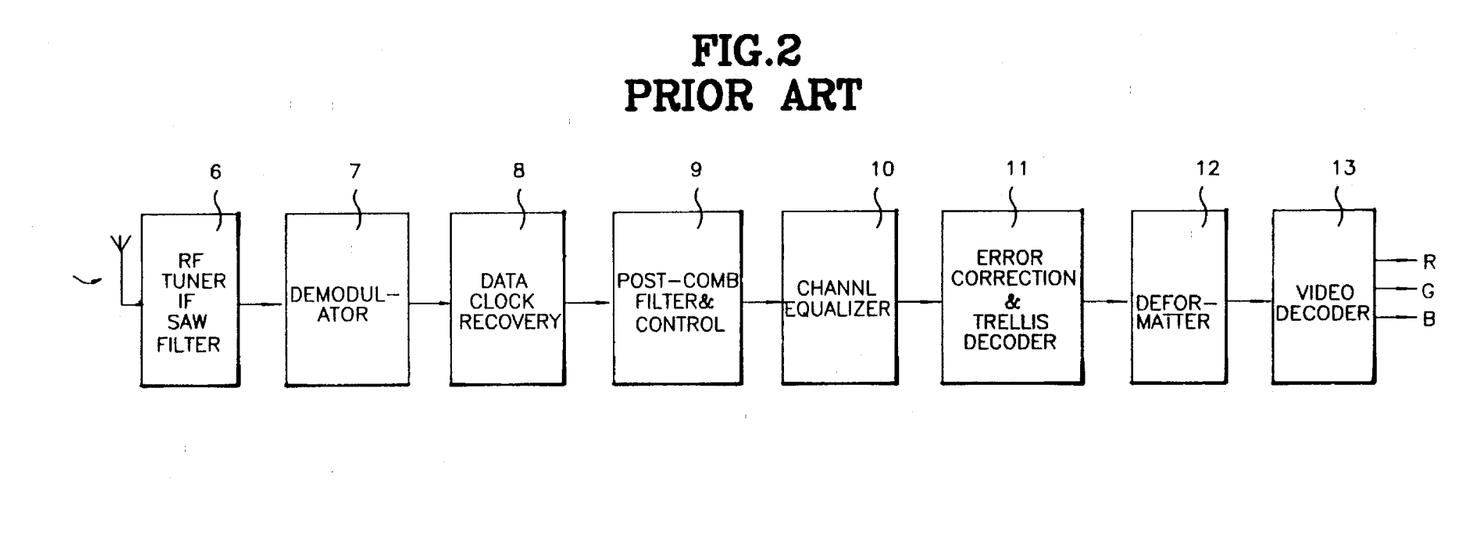
FIG. 2 is a block diagram of a receiving system for an HDTV system.

FIGS. 1 and 2 illustrate the Grand Alliance transmission system which is America's HDTV system.

The transmission system, as shown in FIG. 1, comprises a video encoder 1 for compressing digital video signals R, G and B, an R-S coder & trellis coder 2 for Reed-Solomon coding and trellis coding the signal output from video encoder 1 for the purpose of easy error correction, a precoder 3 for precoding the signal output from R-S coder & trellis coder 2 and thereby canceling NTSC interference, a modulator & SAW filter 4 for forming the signal output from precoder 3 into a form of vestigial side band within 6 MHz, and a transmitter 5 for transmitting the signal output from modulator & SAW filter 4 through an RF channel.

The receiving system, as shown in FIG. 2, comprises an RF tuner & IF SAW filter 6 for selecting a channel and outputting an IF signal, a demodulator 7 for converting the signal output from RF tuner & IF SAW filter 6 into a baseband signal, a data clock recovery portion 8 for detecting a sync signal and clock from the signal output from demodulator 7, a post comb filter & controller 9 for detecting NTSC interference from the signal output from data clock recovery portion 8 and canceling the NTSC interference, a channel equalizer 10 for compensating for a distorted signal output from post comb filter & controller 9, an error correction & trellis decoder 11 for correcting the error of the signal output from channel equalizer 10 through R-S decoding and trellis decoding, a deformatter 12 for deformatting the signal output from error correction & trellis decoder 11, and a video decoder 13 for converting the signal output from deformatter 12 into the original digital video signals R, G and B.

The transmission system for transmitting a broadcasting signal may or may not use precoder 3 depending upon whether the NTSC broadcasting station is present or not. In the receiving system for receiving the broadcasting signal, the use of past comb filter 9 for performing the reverse function of precoder 3 should be determined based on whether or not precoder 3 is employed by the transmission system.

However, the use of precoder 3 cannot be perceived at the receiving port. If there is NTSC interference, precoder 3 is decided to be used and, post comb filter 9 is also employed. If there is no NTSC interference, precoder 3 is not used. In this case, post comb filter 9 is also not used and the signal output from data clock recovery portion 8 passes without change and is output to channel equalizer 10. This process is performed in post comb filter & controller 9.

Figure 3:
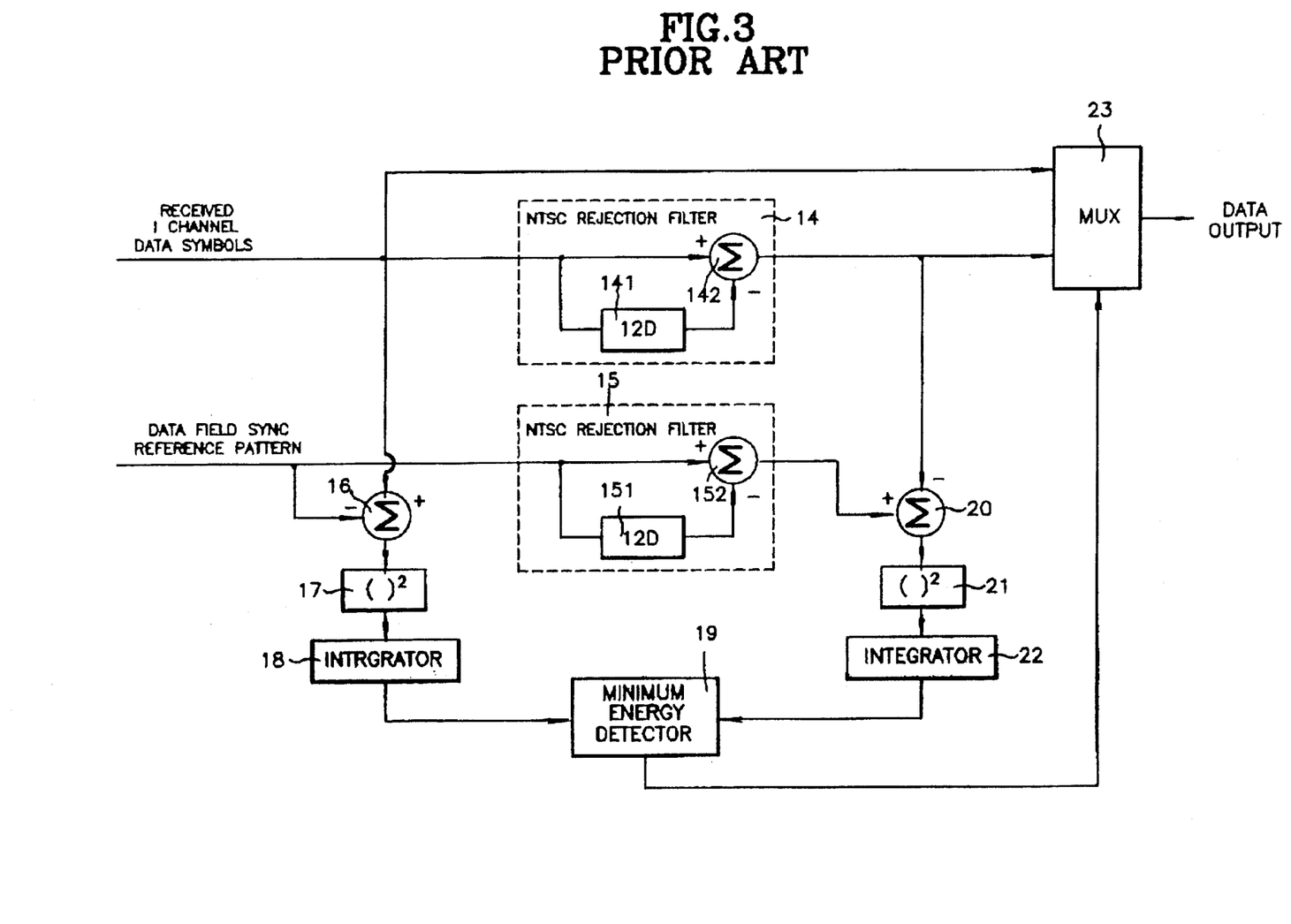
FIG. 3 is a block diagram of a conventional NTSC interference detector.

FIG. 3 is a block diagram of a conventional NTSC interference detector for determining whether the post comb filter of FIG. 2 is used or not.

As shown in FIG. 3, the conventional NTSC interference detector comprises an NTSC removing filter 14 made up of a delay 141 and a subtractor 142 for removing the NTSC component from the received I-channel signal, an NTSC removing filter 15 made up of a delay 151 and subtractor 152 for removing an NTSC component from a data field sync reference pattern, a subtractor 16 for obtaining the difference between a received I-channel signal and the data field sync

2 reference pattern, a subtractor 20 for obtaining the difference between the NTSC removed signal output from NTSC removing filter 14 and the signal output from NTSC removing filter 15, an absoluter 17 for taking the absolute value of the signal output from subtractor 16, an absoluter 21 for taking the absolute value of the signal output from subtractor 20, an integrator 18 for integrating the signal output from absoluter 17 for a predetermined time, an integrator 22 for integrating the signal output from absoluter 21 for a predetermined time, and a minimum energy detector 19 for comparing the signals output from integrators 18 and 22 and selecting a lowest-energy signal between the two signals, thereby outputting a control signal for controlling multiplexer 23 which then selects one of the signal passing through NTSC removing filter 14 and the received I-channel signal.

Figure 4A:
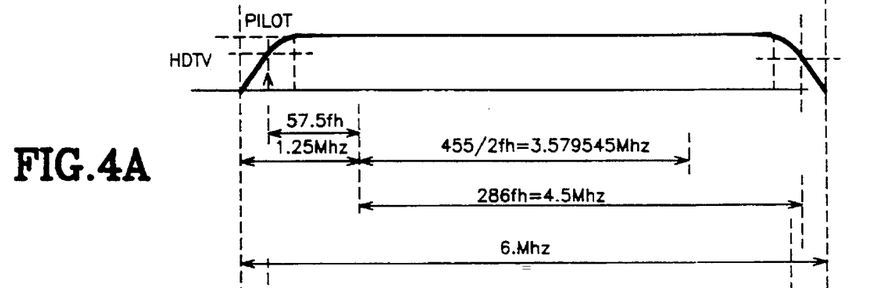
FIG. 4A illustrates the RF spectrum of an HDTV signal.
Figure 4B:
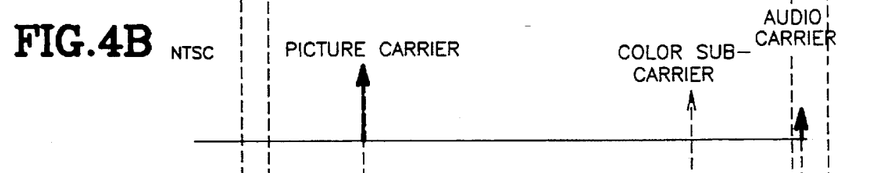
FIG. 4B illustrates the RF spectrum of an NTSC signal.
Figure 4C:
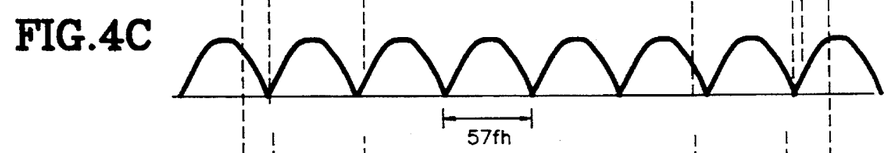
FIG. 4C illustrates the frequency characteristic of an NTSC removing filter.

The operation of the conventional NTSC interference detector will be described with reference to FIGS. 4A, 4B and 4C. The RF spectrum of an HDTV signal to be transmitted is as shown in FIG. 4A. The RF spectrum of an NTSC signal to interfere is as shown in FIG. 4B. The frequency characteristic of NTSC removing filter 14 is shown in FIG. 4C.

Since a picture carrier, color sub-carrier, and audio carrier, all of the NTSC signal, are present around the null point, if the NTSC signal passes through NTSC removing filter 14, those components are canceled. Therefore, if the received I-channel signal passes through NTSC removing filter 14, the NTSC component is removed therefrom.

The received I-channel signal may be selected directly by multiplexer 23 and output without the NTSC interference being removed. The received I-channel signal may also be selected by multiplexer 23 through NTSC removing filter 14 composed of delay 141 and subtractor 142 and output with the NTSC interference removed.

Here, if there is NTSC interference, the signal output through NTSC removing filter 14 is selected by multiplexer 23. If there is no NTSC interference, the received I-channel signal which has not passed through NTSC removing filter 14 is selected and output by multiplexer 23. In order to control the selection of multiplexer 23, there must be an NTSC interference detector for detecting whether the NTSC interference is present or not.

In this case, a data field sync reference pattern is present in the receiver itself so that the signal in which a data field sync signal and data field sync reference pattern have passed NTSC removing filters 14 and 15 out of the received I-channel signal are compared with the data field sync signal and data field sync reference pattern of the I-channel signal, thereby outputting a control signal for controlling multiplexer 23 according to the comparison result.

This process will now be described in greater detail.

Out of the received I-channel signal, the data field sync signal is input to subtractor 16 so that the difference between the data field sync signal and the data field sync reference pattern is calculated. This value indicates the magnitude of NTSC interference. The signal output from subtractor 16 is converted into a positive value in absoluter 17 and integrated for a predetermined period through integrator 18, for instance, until the data field sync reference pattern and data field sync signal are input. The integrated signal is then output to minimum energy detector 19.

Out of the received I-channel signal, the NTSC component of the data field sync signal is canceled through NTSC removing filter 14. The NTSC component of the data field sync reference pattern is canceled through NTSC removing filter 15.

The signal output from NTSC removing filter 14 is input to subtractor 20 and subtracted from the signal output from NTSC removing filter 15. The signal output from subtractor 20 is converted into a positive value in absoluter 21 and integrated through integrator 22 for a predetermined period, for instance, until the data field sync reference pattern and data field sync signal are input. The integrated signal is then output to minimum energy detector 19.

Minimum energy detector 19 compares the signals output from integrators 18 and 22 and outputs a control signal for controlling multiplexer 23 so that multiplexer 23 selects the one of lower energy and a signal corresponding to the lower energy.

If the signal output from integrator 18 has lower energy, minimum energy detector 19 decides that there is no NTSC interference and outputs the control signal so that multiplexer 23 selects and outputs the received I-channel signal. If the signal output from integrator 22 has lower energy, minimum energy detector 19 decides that there is NTSC interference and outputs the control signal so that multiplexer 23 selects and outputs the signal output from NTSC removing filter 14.

However, the conventional NTSC interference detector must detect the presence or absence of NTSC interference based only on the data field sync reference pattern and data field sync signal. This results in a high possibility that the detection of NTSC interference may be inaccurate.

SUMMARY OF THE INVENTION

Therefore, it is an object of the present invention to provide an NTSC interference detector capable of detecting the presence or absence of NTSC interference with respect to the entire I-channel signal received, thereby executing a precise detection of the presence or absence of NTSC interference. To accomplish the object of the present invention, there is provided an NTSC interference detector comprising: an NTSC extracting filter for extracting an NTSC signal component from a received I-channel signal; a comparing portion for integrating the NTSC signal output from the NTSC extracting filter for a predetermined period and deciding whether the NTSC signal component is above a first reference value or not; and a control signal generator for adding the signal output from the comparing portion for every horizontal sync, deciding the presence or absence of NTSC interference according to a second reference value, and outputting a control signal according to the presence or absence of NTSC interference.

Another embodiment of an NTSC interference detector of the present invention comprises an NTSC extracting filter for extracting an NTSC signal component from a received I-channel signal free of the NTSC component; a comparing portion for integrating the NTSC signal output from the NTSC extracting filter for a predetermined period and deciding whether the NTSC signal component is above a first reference value or not; and a control signal generator for adding the signal output from the comparing portion for every horizontal sync, deciding the presence or absence of NTSC interference according to a second reference value, and outputting a control signal according to the presence or absence of NTSC interference.

Still another embodiment of an NTSC interference detector of the present invention comprises a first NTSC extracting filter for extracting an NTSC signal component from a received I-channel signal; a second NTSC extracting filter for extracting an NTSC signal component from a received I-channel signal free of the NTSC component; a comparing portion for integrating the difference between the NTSC signals output from the first and second NTSC extracting filters for a predetermined period and deciding whether the difference is above a first reference value or not; and a control signal generator for adding the signal output from the comparing portion for every horizontal sync, deciding the presence or absence of NTSC interference according to a second reference value, and outputting a control signal according to the presence or absence of NTSC interference.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 5:
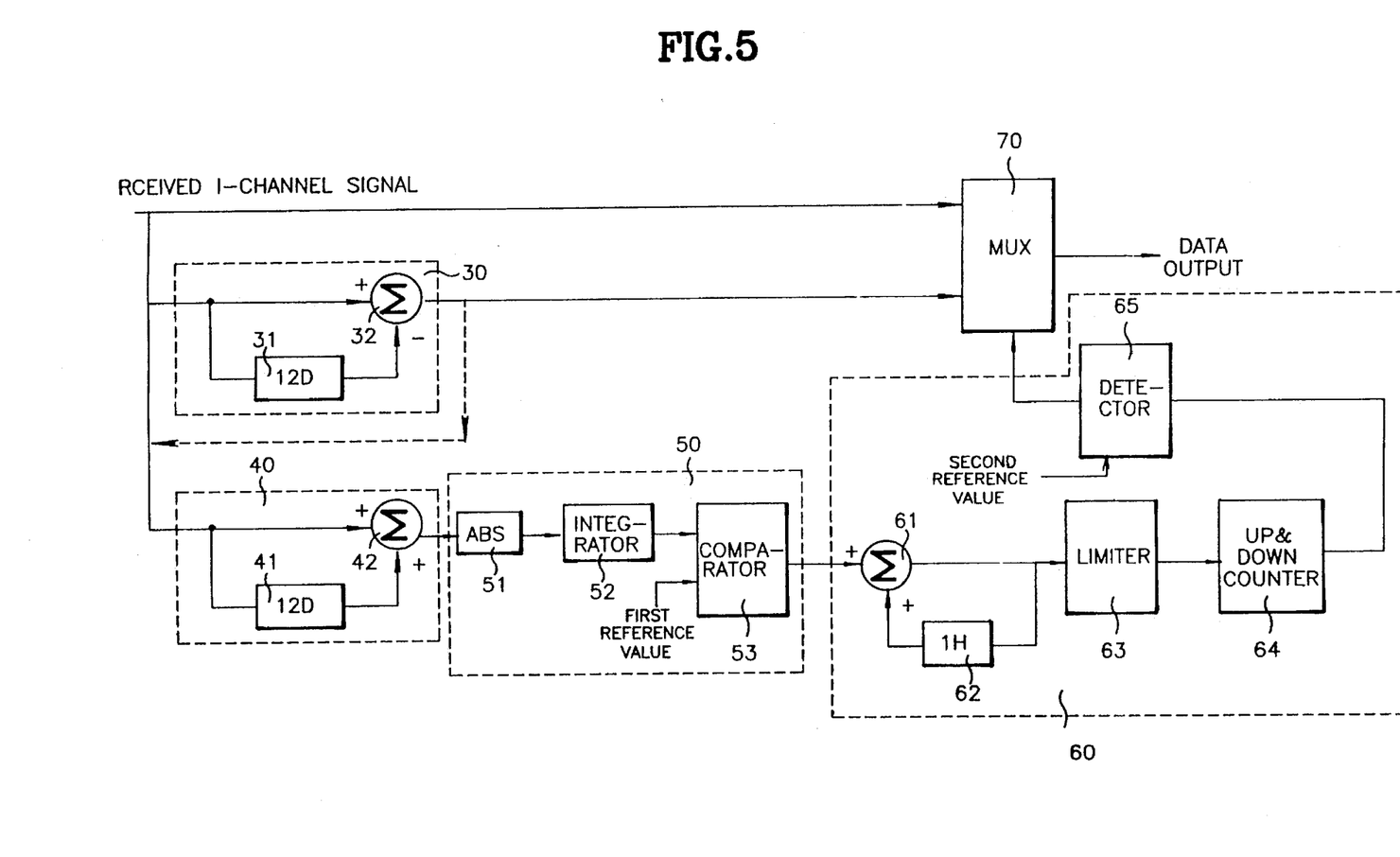
FIG. 5 is a block diagram of one embodiment of an NTSC interference detector of the present invention.

Referring to FIG. 5, one embodiment of NTSC interference detector of the present invention comprises an NTSC extracting filter 40, a comparing portion 50 and a control signal generator 60.

NTSC extracting filter 40, made up of a delay 41 for delaying the received I-channel signal by 12 symbols and an adder 42 for summing the received I-channel signal and the signal output from delay 41, thereby extracting an NTSC signal component from the received I-channel signal. Here, the symbol rate is 10.76 MHz.

Comparing portion 50 comprises an absoluter 51 for taking the absolute value of the signal output from adder 42, an integrator 52 for integrating the signal output from absoluter 51 for a predetermined period, and a comparator 53 for comparing the signal output from integrator 52 with a first reference value. The comparing portion integrates the NTSC signal output from NTSC extracting filter 40 for a predetermined period and decides whether the NTSC signal component is above the first reference value or not.

Control signal generator 60 comprises an adder 61 for summing the signal output from comparator 53 according to every horizontal sync, a delay 62 for delaying the signal output from adder 61 for a horizontal sync and outputting the delayed signal to adder 61, a limiter 63 for limiting the signal output from adder 61, an up/down counter 64 for counting up/down according to the signal output from limiter 63, and a detector 65 for comparing the signal output from up/down counter 64 with a second reference value and outputting a control signal indicative of the presence or absence of NTSC interference. The control signal generator 60 adds the signal output from comparator 50 for every horizontal sync, thereby deciding the presence or absence of NTSC interference according to the second reference value and outputting a control signal for controlling the operation of multiplexer 70 according to the presence or absence of NTSC interference.

The operation of one embodiment of the NTSC interference detector of the present invention will be described below with reference to FIGS. 4A, 4B, 4C and 4D.

FIGS. 4A, 4B and 4C are intended to explain the co-channel of HDTV signal and NTSC signal and the NTSC interference becoming a problem when the HDTV and NTSC signals are present together. FIG. 4A illustrates the RF spectrum of HDTV to be transmitted. FIG. 4B illustrates the RF spectrum of NTSC signal to interfere.

Figure 6A:
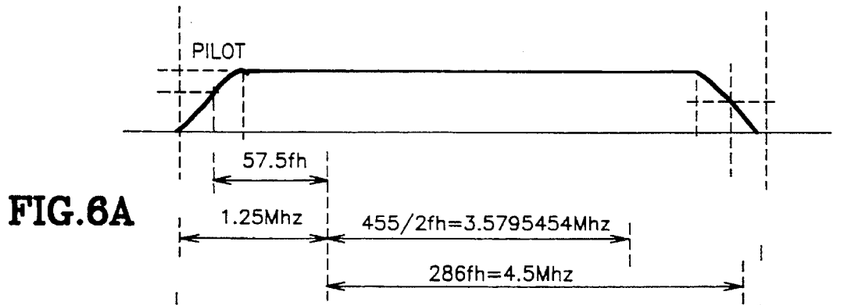
FIG. 6A illustrates the RF spectrum of an HDTV signal.
Figure 6B:
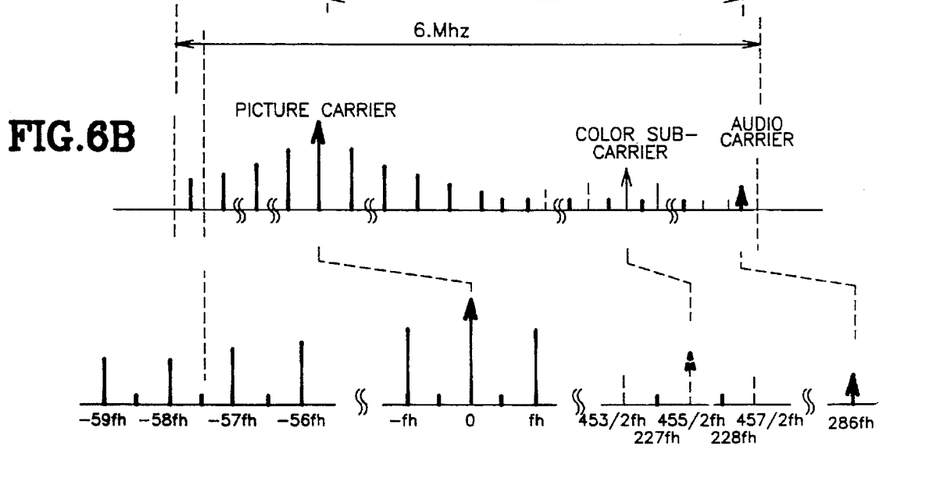
FIG. 6B illustrates the RF spectrum of an NTSC signal.

The co-channel spectra of HDTV and NTSC signal are compared and shown in FIGS. 6A and 6B. FIG. 6A illustrates the RF spectrum of the HDTV signal. FIG. 6B illustrates the RF spectrum of NTSC signal. According to those spectra, the harmonic component of the NTSC signal exists around the picture carrier, color sub-carrier and audio carrier.

The beat between the pilot of the HDTV signal and the picture carrier of NTSC signal is 57.5 fh. Here, fh is the horizontal frequency of NTSC signal. The color sub-carrier and audio carrier of NTSC signal act as NTSC interference. In order to cancel it, a comb filter and an NTSC removing filter, is used. FIG. 4C illustrates the frequency characteristic of NTSC removing filter 30.

Out of the received I-channel signal, the NTSC component is canceled according to the frequency characteristic shown in FIG. 4C via NTSC removing filter 30 composed of a delay 31 for delaying the received I-channel signal for 12 symbols and an adder 32 for summing the received I-channel signal and the signal output from delay 31. Here, the control signal for determining whether the NTSC removing filter 30 is used or not must be generated. For this purpose, the NTSC interference detector is used.

The received I-channel signal is output to multiplexer 70 still containing the NTSC component. The received I-channel signal is also output to multiplexer 70 with the NTSC component being removed via NTSC removing filter 30. Here, multiplexer 70 selects and outputs one of the received I-channel signal and the signal having passed NTSC removing filter 30. In order to control this case, the presence or absence of NTSC interference must be determined. This function is performed in the NTSC interference detector.

Figure 4D:
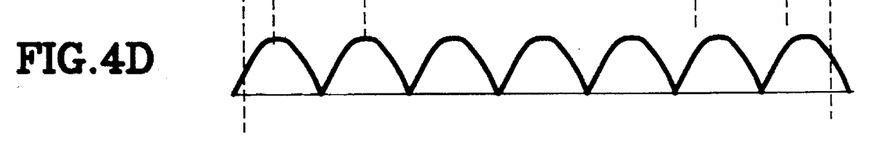
FIG. 4D illustrates the frequency characteristic of an NTSC extracting filter.

The NTSC component of the received I-channel signal is extracted through NTSC extracting filter 40. The frequency characteristic of NTSC extracting filter 40 is as shown in FIG. 4D. When the signal passes through NTSC extracting filter 40, it has a frequency characteristic in which the NTSC picture carrier, color sub-carriers, and audio carrier are all extracted.

The signal output from NTSC extracting filter 40 is input to comparing portion 50 and converted into a positive value in absoluter 51. Then, the signal is integrated in integrator 52 for a predetermined period and compared with the first reference value in comparator 53. If the signal output from integrator 52 is above the first reference value, comparator 53 outputs a high level signal, that is, a positive signal. If the signal output from integrator 52 is below the first reference value, a low level signal, that is, a negative signal, is output.

The signal output from comparator 53 of comparing portion 50 is input to control signal generator 60 and added for every horizontal sync through adder 61 and delay 62. The added signal is then output to limiter 63. Here, the signal output from comparator 53 is, if negative, reduced through adder 61 and delay 62 and output to limiter 63. If the signal output from comparator 53 is positive, the signal is incremented through adder 61 and delay 62 and output to limiter 63. If there is NTSC interference continuously, the signal input to limiter 63 through adder 61 and delay 62 is incremented for every horizontal sync and limited in limiter 63.

The signal output from limiter 63 is counted up/down in up/down counter 64. If the signal output from limiter 63 is the maximum, up/down counter 64 counts up. If the signal output from limiter 63 is below the maximum, up/down counter 64 counts down.

Here, when up/down counter 64 continues to count up until the maximum, the value is-maintained and the counting up is no longer performed. If up/down counter 64 continues to count down until the minimum, the value is maintained and the counting down is no longer performed.

The signal output from up/down counter 64 is compared with the second reference value in detector 65 and output as a control signal indicative of the presence or absence of NTSC interference. If the signal output from up/down counter 64 is below the second reference value, detector 65 decides that there is no NTSC interference and outputs a control signal so that multiplexer 70 selects and outputs the received I-channel signal. If the signal output from up/down counter 64 is above the second reference value, the detector 65 decides that there is NTSC interference and outputs a control signal so that multiplexer 70 selects and outputs the signal output from NTSC removing filter 30. Therefore, if the signal output from up/down counter 64 is the minimum, multiplexer 70 selects the received I-channel signal. If the signal output from up/down counter 64 is the maximum, multiplexer 70 selects the signal output from NTSC removing filter 30.

In another embodiment of the NTSC interference detector, NTSC extracting filter 40 may be installed at the back portion of NTSC removing filter 30 so that the NTSC signal component is extracted from the I-channel signal free of the NTSC component. In this case, the configuration and operation are the same as the first embodiment of the NTSC interference detector of the present invention, except that the presence or absence of NTSC interference is detected from the I-channel signal free of NTSC interference.

Figure 7:
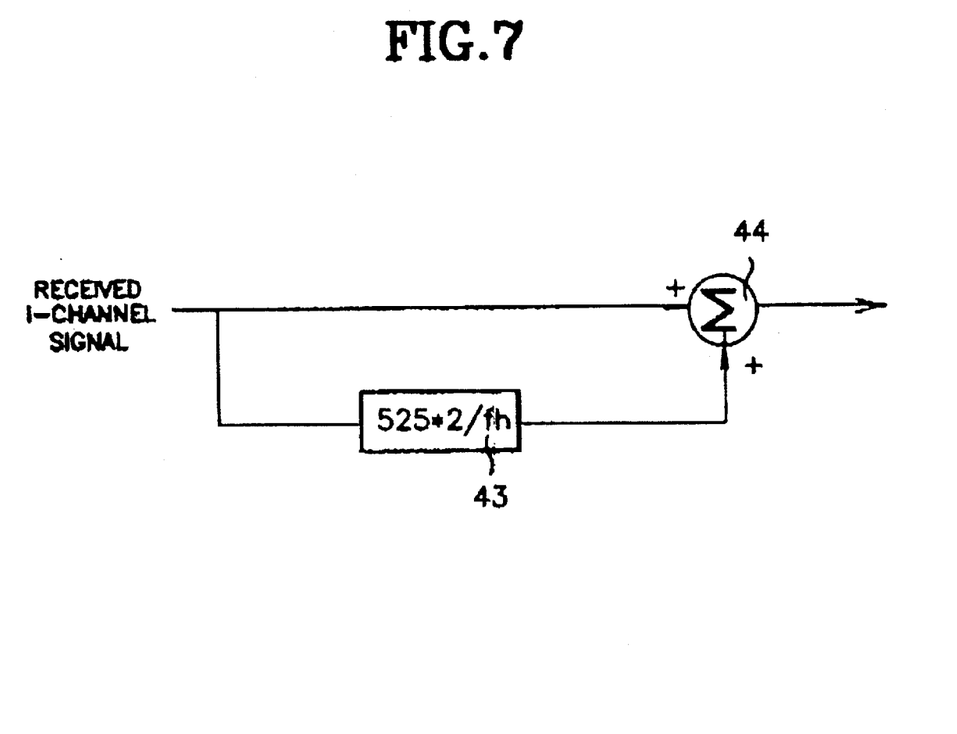
FIG. 7 is a block diagram of another embodiment of the NTSC extracting filter of FIG. 5.

Another embodiment of NTSC extracting filter 40, as shown in FIG. 7, has a delay 43 for delaying the received I-channel signal for 525×2/fh and an adder 44 for summing the received I-channel signal and the signal output from delay 43.

The operation of this embodiment of NTSC extracting filter 40 will be explained with reference to FIGS. 8A, 8B and 8C.

The received I-channel signal is delayed in delay 43 for 525×2/fh and added to the currently received I-channel signal. By doing so, the NTSC signal is extracted.

Figure 8A:
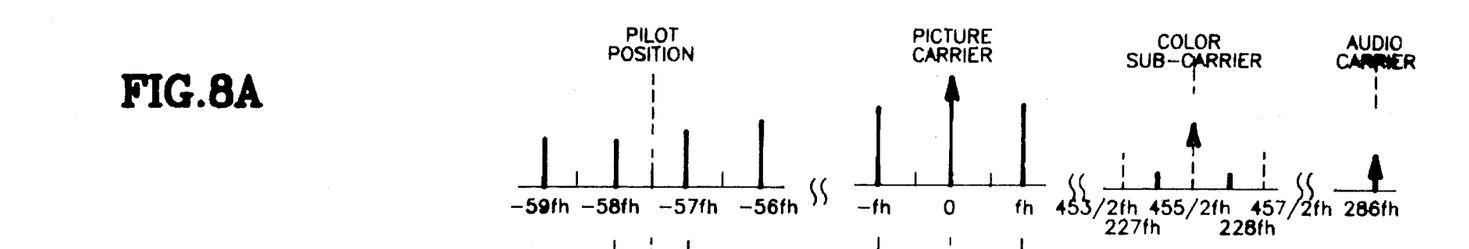
FIG. 8A illustrates the location of the carrier of the NTSC signal.
Figure 8B:
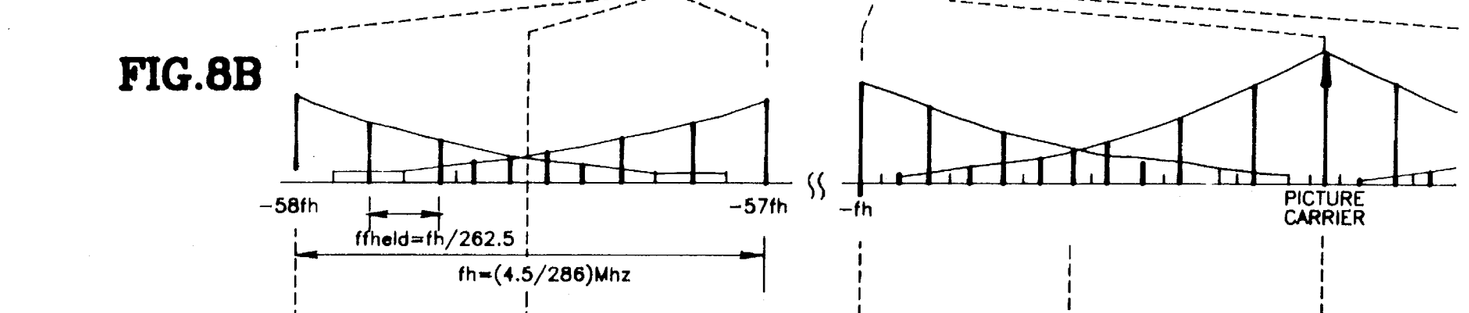
FIG. 8B illustrates the harmonic of the NTSC signal.
Figure 8C:
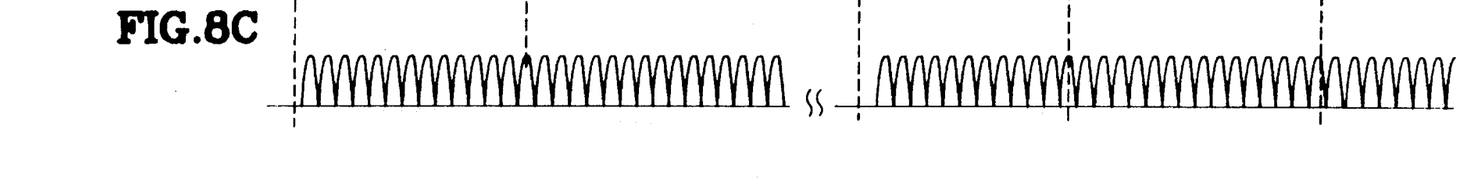
FIG. 8C illustrates the frequency characteristic of the NTSC extracting filter of FIG. 7.

The post comb filter, NTSC extracting filter 40, performing such operation, has the frequency characteristic as shown in FIG. 8C.

FIG. 8A illustrates the location of carrier of NTSC signal. FIG. 8B shows the detailed harmonic component centering on the carrier of NTSC signal. In this drawing, it is noted that the harmonic component of color sub-carrier and the harmonic component of picture carrier are mixed. The NTSC signal component of FIG. 8B can act as the NTSC interference component to HDTV signal. However, with the NTSC interference detector using the comb filter of the frequency characteristic shown in FIG. 8C, NTSC interference can be perfectly detected.

Figure 9:
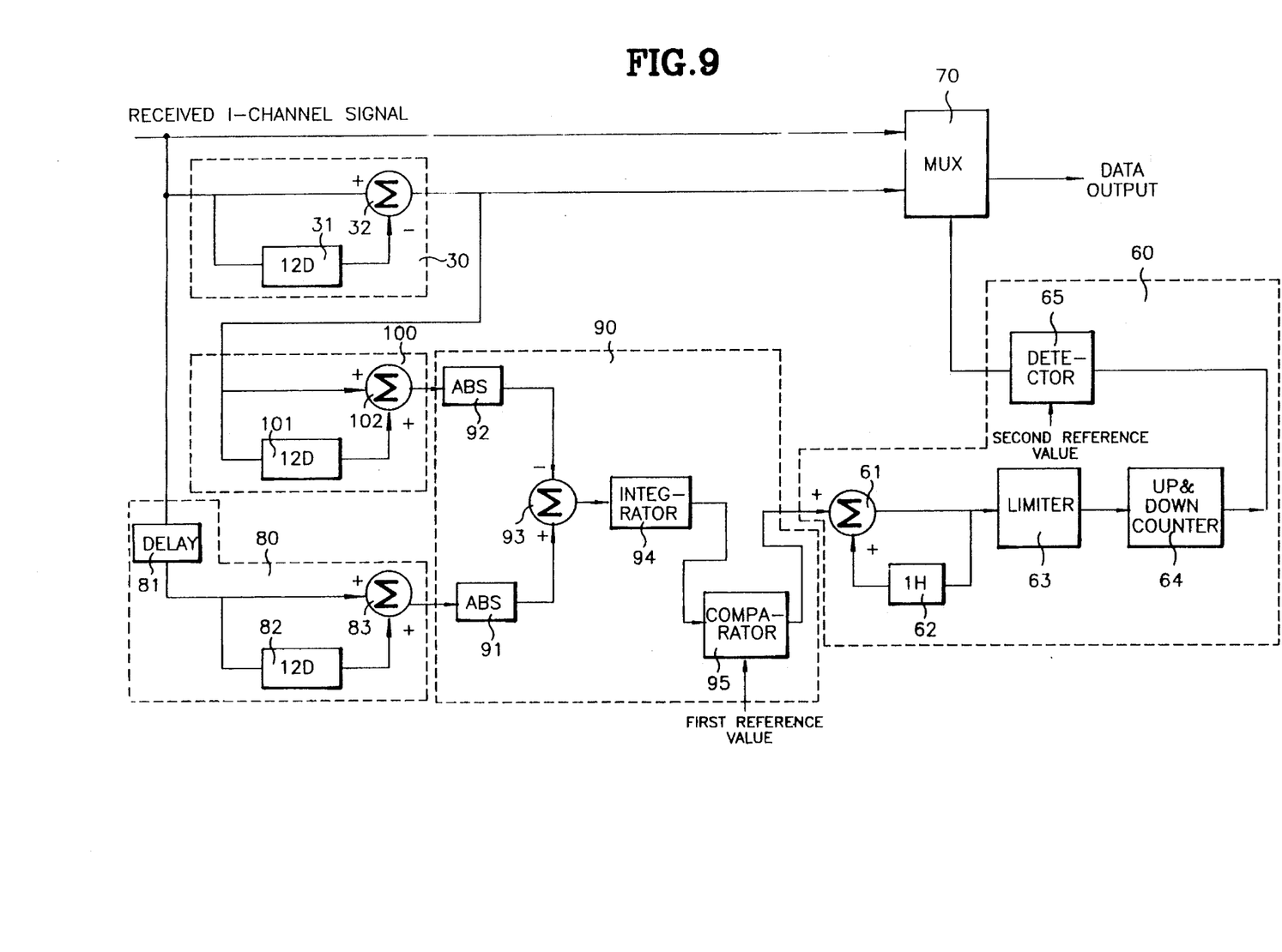
FIG. 9 is a block diagram of another embodiment of the NTSC interference detector of the present invention.

Still another embodiment of the NTSC interference detector of the present invention is made up of two NTSC extracting filters 80 and 100, a comparator 90, and control signal generator 60 as shown in FIG. 9.

NTSC extracting filter 80 has a delay 81 for delaying the received I-channel signal for a period during which the NTSC component is canceled, a delay 82 for delaying the signal output from delay 81 for 12 symbols, and an adder 83 for adding the signal output from delay 82 so as to extract the NTSC signal component from the received I-channel signal. NTSC extracting filter 100 has a delay 101 for delaying the I-channel signal free of NTSC component for 12 symbols, and an adder 102 for summing the I-channel signal free of NTSC component and the signal output from delay 101, so as to extract the NTSC signal component from the I-channel signal free of NTSC component.

Comparing portion 90 comprises an absoluter 91 for taking the absolute value of the signal output from NTSC extracting filter 80, an absoluter 92 for taking the absolute value of the signal output from NTSC extracting filter 100, a subtractor 93 for calculating the difference between the signals output from absoluters 91 and 92, an integrator 94 for integrating the signal output from subtractor 93 for a predetermined period, and a comparator 95 for comparing the signal output from integrator 94 with a first reference value. The comparing portion integrates the difference between the NTSC signals output from NTSC extracting filters 80 and 100 for a predetermined period and decides whether the difference is above the first reference value or not.

Control signal generator 60, as in the first embodiment of the NTSC interference detector of the present invention, comprises an adder 61 for summing the signal output from comparing portion 90 according to every horizontal sync, a delay 62 for delaying the signal output from adder 61 for a horizontal sync and outputting the delayed signal to adder 61, a limiter 63 for limiting the signal output from adder 61, an up/down counter 64 for counting up/down according to the signal output from limiter 63, and a detector 65 for comparing the signal output from up/down counter 64 with a second reference value and outputting a control signal indicative of the presence or absence of NTSC interference. The control signal generator adds the signal output from comparing portion 90 for every horizontal sync, thereby deciding the presence or absence of NTSC interference according to the second reference value and outputting a control signal indicative of the presence or absence off NTSC interference.

In another embodiment of the NTSC detector of the present invention, NTSC interference is extracted and compared at the front and back of post comb filter, NTSC removing filter 30. If the magnitudes of the NTSC signals extracted at the front and back of NTSC removing filter 30 are the same, this case indicates that there is no NTSC interference in the received I-channel signal. Therefore, multiplexer 70 selects and outputs the received I-channel signal. If the magnitudes of NTSC signals extracted at the front and back of NTSC removing filter 30 are different, there is NTSC interference in the received I-channel signal and a control signal is output so that multiplier 70 selects and outputs the signal output from NTSC removing filter 30. The operation of this embodiment will be described below.

The received I-channel signal is delayed for a time required to cancel the NTSC component through NTSC removing filter 30 in delay 81 and for 12 symbols in delay 82. The NTSC component is extracted after passing through adder 83 for summing the signals output from delays 81 and 82.

The I-channel signal in which the NTSC component is canceled through NTSC removing filter 30, passes through delay 101 for delaying the signal for 12 symbols and adder 102 for summing the I-channel signal free of NTSC component and the signal output from delay 101 so that the NTSC component is extracted. Here, NTSC extracting filters 80 and 100 have the filter characteristic as shown in FIG. 4D.

The signals output from NTSC extracting filters 80 and 100 are input to comparing portion 90 and converted into positive values in absoluters 91 and 92, respectively. The difference between the signals is calculated in subtractor 93 and integrated for a predetermined period in integrator 94 to thereby obtain a DC component in a predetermined section.

After the integration for a predetermined period in integrator 94, the integrated signal is compared with the first reference value in comparator 95. If the signal output from integrator 94 is above the first reference value, comparator 95 outputs a high level signal, that is, a positive signal. If the signal output from integrator 94 is below the first reference value, a low level signal, that is, a negative signal, is output.

The signal output from comparator 95 of comparing portion 90 is input to control signal generator 60 and added for every horizontal sync through adder 61 and delay 62. The added signal is output to limiter 63. Here, the signal output from comparator 95 is, if negative, reduced through adder 61 and delay 62 and output to limiter 63. If the signal output from comparator 95 is positive, the signal is incremented through adder 61 and delay 62 and output to limiter 63. If there is NTSC interference continuously, the signal input to limiter 63 through adder 61 and delay 62 is incremented for every horizontal sync and limited in limiter 63.

The signal output from limiter 63 is counted up/down in up/down counter 64. If the signal output from limiter 63 is the maximum, up/down counter 64 counts up. If the signal output from limiter 63 is below the maximum, up/down counter 64 counts down.

Here, when up/down counter 64 continues to count up until the maximum, the value is maintained and the counting up is no longer performed. If up/down counter 64 continues to count down until the minimum, the value is maintained and the counting down is no longer performed.

The signal output from up/down counter 64 is compared with the second reference value in detector 65 and output as a control signal indicative of the presence or absence of NTSC interference. If the signal output from up/down counter 64 is below the second reference value, detector 65 decides that there is no NTSC interference and outputs a control signal so that multiplexer 70 selects and outputs the received I-channel signal. If the signal output from up/down counter 64 is above the second reference value, the detector 65 decides that there is NTSC interference and outputs a control signal so that multiplexer 70 selects and outputs the signal output from NTSC removing filter 30. Therefore, if the signal output from up/down counter 64 is the minimum, multiplexer 70 selects the received I-channel signal. If the signal output from up/down counter 64 is the maximum, multiplexer 70 selects the signal output from NTSC removing filter 30.

As described above, as compared with the conventional NTSC detector which uses only the portion of field sync, in the present invention, NTSC interference is detected over the entire section of received data and the data field sync reference pattern is not used, accomplishing the precise detection of NTSC interference.

What is claimed is:

1. An NTSC interference detector comprising:

an NTSC extracting filter for extracting an NTSC signal component from a received I-channel signal;

a comparing portion for integrating said NTSC signal output from said NTSC extracting filter for a predetermined period and deciding whether said NTSC signal component is above a first reference value or not; and a control signal generator for adding the signal output from said comparing portion for every horizontal sync, deciding the presence or absence of NTSC interference according to a second reference value, and outputting a control signal according to the presence or absence of NTSC interference.

2. An NTSC interference detector as claimed in claim 1, wherein said NTSC extracting filter comprises:

a delay for delaying said received I-channel signal for 12 symbols; and an adder for summing said received I-channel signal and the signal output from said delay.

3. An NTSC interference detector as claimed in claim 1, wherein said NTSC extracting filter comprises:

a delay for delaying said received I-channel signal for 525×2/fh, wherein fh is the horizontal frequency of an NTSC signal; and an adder for summing said received I-channel signal and the signal output from said delay.

4. An NTSC interference detector as claimed in claim 1, wherein said comparing portion comprises:

an absoluter for taking the absolute value of the signal output from said NTSC extracting filter;

an integrator for integrating the signal output from said absoluter for a predetermined period; and a comparator for comparing the signal output from said integrator with said first reference value.

5. An NTSC interference detector as claimed in claim 1, wherein said control signal generator comprises:

an adder for adding the signal output from said comparing portion for every horizontal sync;

a delay for delaying the signal output from said adder for a horizontal sync and outputting the delayed signal to said adder;

a limiter for limiting the signal output from said adder;

an up/down counter for counting up and down according to the signal output from said limiter; and a detector for comparing the signal output from said up/down, counter with said second reference value and outputting a control signal indicative of the presence or absence of NTSC interference.

6. An NTSC interference detector comprising:

an NTSC extracting filter for extracting an NTSC signal component from a received I-channel signal free of the NTSC component;

a comparing portion for integrating said NTSC signal output from said NTSC extracting filter for a predetermined period and deciding whether said NTSC signal component is above a first reference value or not; and a control signal generator for adding the signal output from said comparing portion for every horizontal sync, deciding the presence or absence of NTSC interference according to a second; reference value, and outputting a control signal according to the presence or absence of NTSC interference.

7. An NTSC interference detector as claimed in claim 6, wherein said NTSC extracting filter comprises:

a delay for delaying said received I-channel signal free of NTSC component for 12 symbols; and an adder for summing said received I-channel signal free of NTSC component and the signal output from said delay.

8. An NTSC interference detector as claimed in claim 6, wherein said NTSC extracting filter comprises:

a delay for delaying said received I-channel signal free of NTSC component for 525×2/fh; and an adder for summing said received I-channel signal free of NTSC component and the signal output from said delay.

9. An NTSC interference detector as claimed in claim 6, wherein said comparing portion comprises:

an absoluter for taking the absolute value of the signal output from said NTSC extracting filter;

an integrator for integrating the signal output from said absoluter for a predetermined period; and a comparator for comparing the signal output from said integrator with said first reference value.

10. An NTSC interference detector as claimed in claim 6, wherein said control signal generator comprises:

an adder for adding the signal output from said comparing portion for every horizontal sync;

a delay for delaying the signal output from said adder for a horizontal sync and outputting the delayed signal to said adder;

a limiter for limiting the signal output from said adder;

an up/down counter for counting up and down according to the signal output from said limiter; and a detector for comparing the signal output from said up/down counter with said second reference value and outputting a control signal indicative of the presence or absence of NTSC interference.

11. An NTSC interference detector comprising:

a first NTSC extracting filter for extracting an NTSC signal component from a received I-channel signal;

a second NTSC extracting filter for extracting an NTSC signal component from a received I-channel signal free of the NTSC component;

a comparing portion for integrating the difference between said NTSC signals output from said first and second NTSC extracting filters for a predetermined period and deciding whether said difference is above a first reference value or not; and a control signal generator for adding the signal output from said comparing portion for every horizontal sync, deciding the presence or absence of NTSC interference according to a second reference value, and outputting a control signal according to the presence or absence of NTSC interference.

12. An NTSC interference detector as claimed in claim 11, wherein said first NTSC extracting filter comprises:

a first delay for delaying said received I-channel signal for a time required to the NTSC component;

a second delay for delaying said signal output from said first delay for 12 symbols; and an adder for summing said signals output from said first and second delays.

13. An NTSC interference detector as claimed in claim 11, wherein said second NTSC extracting filter comprises:

a delay for delaying said received I-channel signal free of NTSC component for 12 symbols; and an adder for summing said received I-channel signal free of NTSC component and the signal output from said delay.

14. An NTSC interference detector as claimed in claim 11, wherein said comparing portion comprises:

a first absoluter for taking the absolute value of the signal output from said first NTSC extracting filter;

a second absoluter for taking the absolute value of the signal output from said second NTSC extracting filter;

a subtractor for calculating the difference between the signals output from said first and second absoluters; an integrator for integrating the signal output from subtractor for a predetermined period; and a comparator for comparing the signal output from integrator with said first reference value.

15. An NTSC interference detector as claim 11, wherein said control signal generator comprises:

an adder for adding the signal output from said comparing portion for every horizontal sync;

a delay for delaying the signal output from said adder for a horizontal sync and outputting the delayed signal to said adder;

a limiter for limiting the signal output from said adder;

an up/down counter for counting up and down according to the signal output from said limiter; and a detector for comparing the signal output from said up/down counter with said second reference value and outputting a control signal indicative of the presence or absence of NTSC interference.

* * * * *